United States Patent [19]
Thompson et al.

[11] 3,811,516
[45] May 21, 1974

[54] FOLDING WING LOCK

[75] Inventors: Howard G. Thompson, Livonia; John A. Kay, Jr., Birmingham, both of Mich.

[73] Assignee: Massey-Ferguson Inc., Detroit, Mich.

[22] Filed: Nov. 10, 1972

[21] Appl. No.: 306,252

Related U.S. Application Data

[63] Continuation of Ser. No. 59,281, July 29, 1970, abandoned.

[52] U.S. Cl.............. 172/311, 16/147, 172/456, 172/572, 292/240
[51] Int. Cl............. A01b 49/00, E05c 3/14
[58] Field of Search.......... 172/311, 456, 568, 572, 172/582, 600, 751; 16/144, 147; 280/411, 412, 414, 515; 292/4, 5, 57, 58, 240, 241, 302, 304; 296/35 A

[56] References Cited
UNITED STATES PATENTS

| | | | |
|---|---|---|---|
| 902,770 | 11/1908 | Spinner | 172/751 |
| 942,532 | 12/1909 | Anderson | 280/411 R |
| 1,148,791 | 8/1915 | Nelson | 280/411 A |
| 3,032,353 | 5/1962 | Williams et al. | 280/414 R |
| 3,362,484 | 1/1968 | Walberg | 172/568 |
| 3,542,138 | 11/1970 | Fackler et al. | 172/311 X |
| 3,593,805 | 7/1971 | Rau | 172/456 X |
| 3,702,198 | 11/1972 | Alley | 280/515 |

*Primary Examiner*—Robert E. Pulfrey
*Assistant Examiner*—Paul T. Sewell
*Attorney, Agent, or Firm*—Robert L. Farris

[57] ABSTRACT

A folding wing lock for a disc harrow including a main gang, a folding wing gang pivotally attached to the main gang by a hinge pin for pivotal movement about the axis of the hinge pin, an aperture through the main gang spaced from and parallel to the pivotal axis between the two gangs, and plates rigidly attached to the folding wing gang which are adjacent to each end of the aperture in the main gang and have apertures that may be aligned with the aperture in the main gang. A locking pin is inserted through the aperture in one of the plates, through the aperture in the main gang and then through the aperture in the other plate. A cam on the locking pin contacts a cam surface on one of the plates and upon rotation of the locking pin, rotates the folding wing gang about the axis of the hinge pin until both ends of the locking pin are securely clamped between the plates and the aperture in the main gang.

5 Claims, 6 Drawing Figures

INVENTORS.
HOWARD G. THOMPSON
BY JOHN ALLAN KAY, JR.
Gerhardt, Greenlee & Farris
ATTORNEYS.

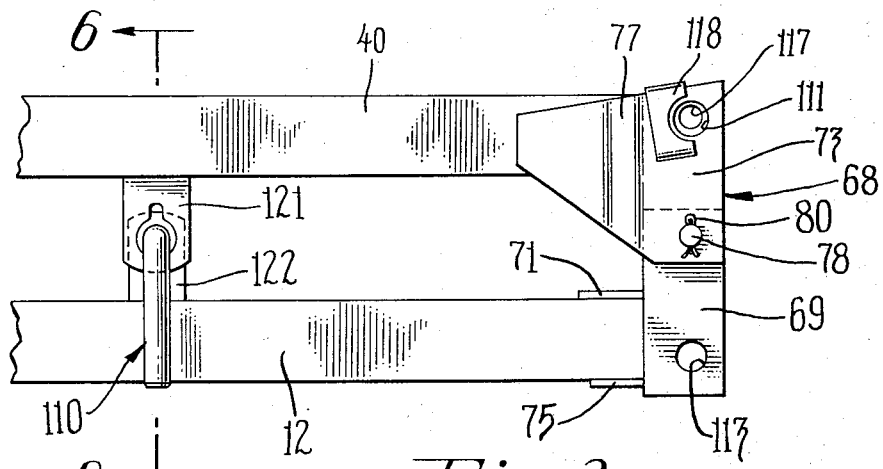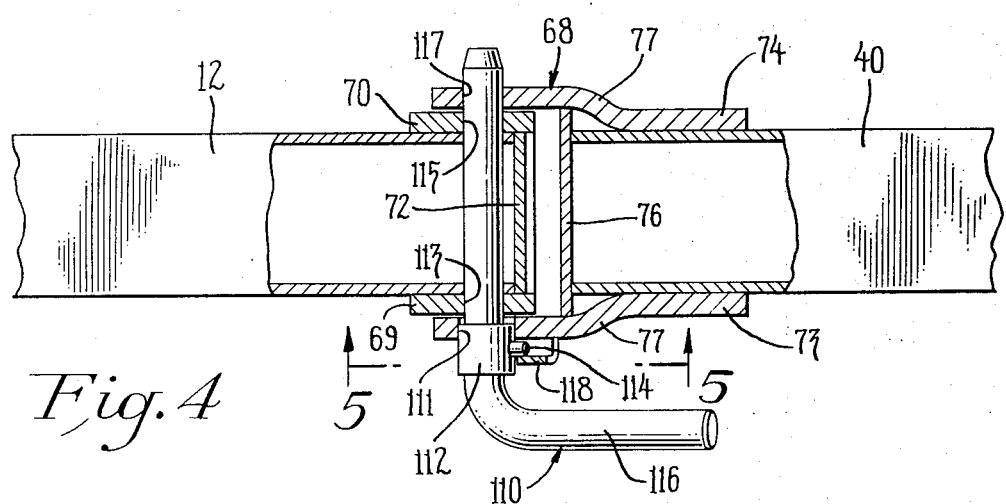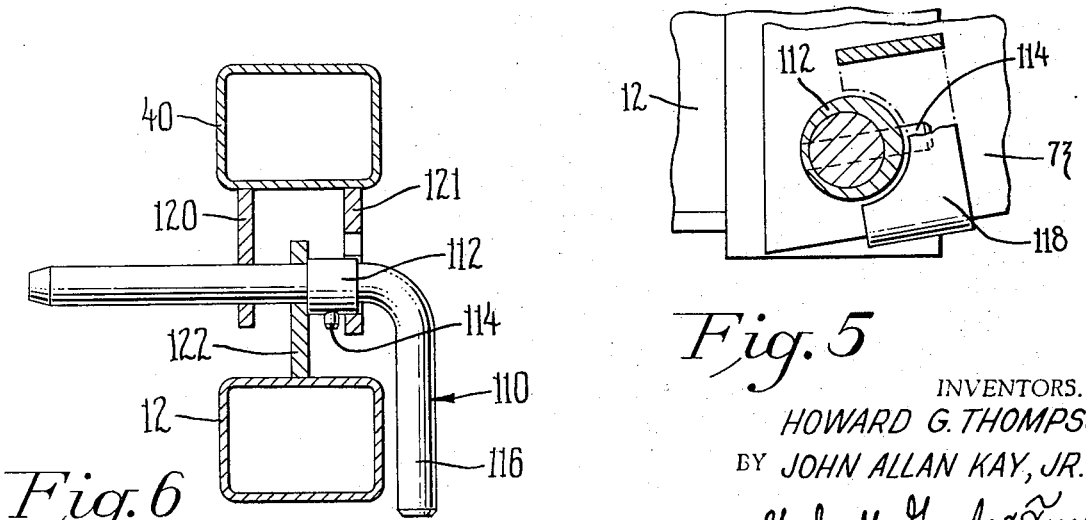

3,811,516

FOLDING WING LOCK

This is a continuation of application Ser. No. 59,281, filed July 29, 1970 now abandoned.

This invention relates to a locking device and more particularly to a simplified inexpensive device for locking folding wing gangs on a tandem disc harrow in an earthworking position.

Folding wings are commonly used on large tandem disc harrows and other types of implements. In some cases it is desirable to rigidly secure the folding wings to the remainder of the implement. With tandem disc harrows the folding wings must be rigidly secured as by locking the hinge between the folding wing and the remainder of the implement to prevent excessive wear on the hinge and to insure uniform penetration of the soil by the discs. Uniform penetration by the discs is an absolute necessity to prevent the formation of ridges on the ground. Fields with ridges are very undesirable, since the ridges tend to reudce the efficiency of harvesting machines. Ridges will also result in an uneven crop due to the lack of moisture on the ridges.

The improved folding wing lock of this invention is for an agricultural implement having a main gang, a folding wing gang and a hinge pin for pivotally attaching the folding wing gang to the main gang. An aperture spaced from the axis of the hinge pin passes through one of the gangs. A first and a second portion of the other gang include apertures in alignment with the aperture through the one gang. A locking pin extends through the aperture in the first portion of the other gang, through the aperture in the one gang and then through the aperture in the second portion of the other gang. A cam member is in contact with the locking pin and the first portion of the other gang. The cam member is operable to pivot the folding wing gang relative to the main gang until the locking pin prevents further pivotal movement about the axis of the hinge pin.

In order that the invention may be more fully understood, an embodiment will now be described with reference to the accompanying drawings in which:

FIG. 3 is an enlarged side elevation similar to FIG. 2 with the folding wing in a folded transport position;

FIG. 4 is an enlarged sectional view taken along lines 4—4 of FIG. 2;

FIG. 5 is an enlarged sectional view taken along lines 5—5 of FIG. 4; and

FIG. 6 is a sectional view taken along lines 6—6 of FIG. 3.

The folding wing locking device is illustrated as a part of a disc harrow. It would preferably be part of a tandem disc harrow. However, the locking device could be used on agricultural implements other than disc harrows if desired. With minor modification, the locking device could be used to lock any hinge joint.

Figure 1:
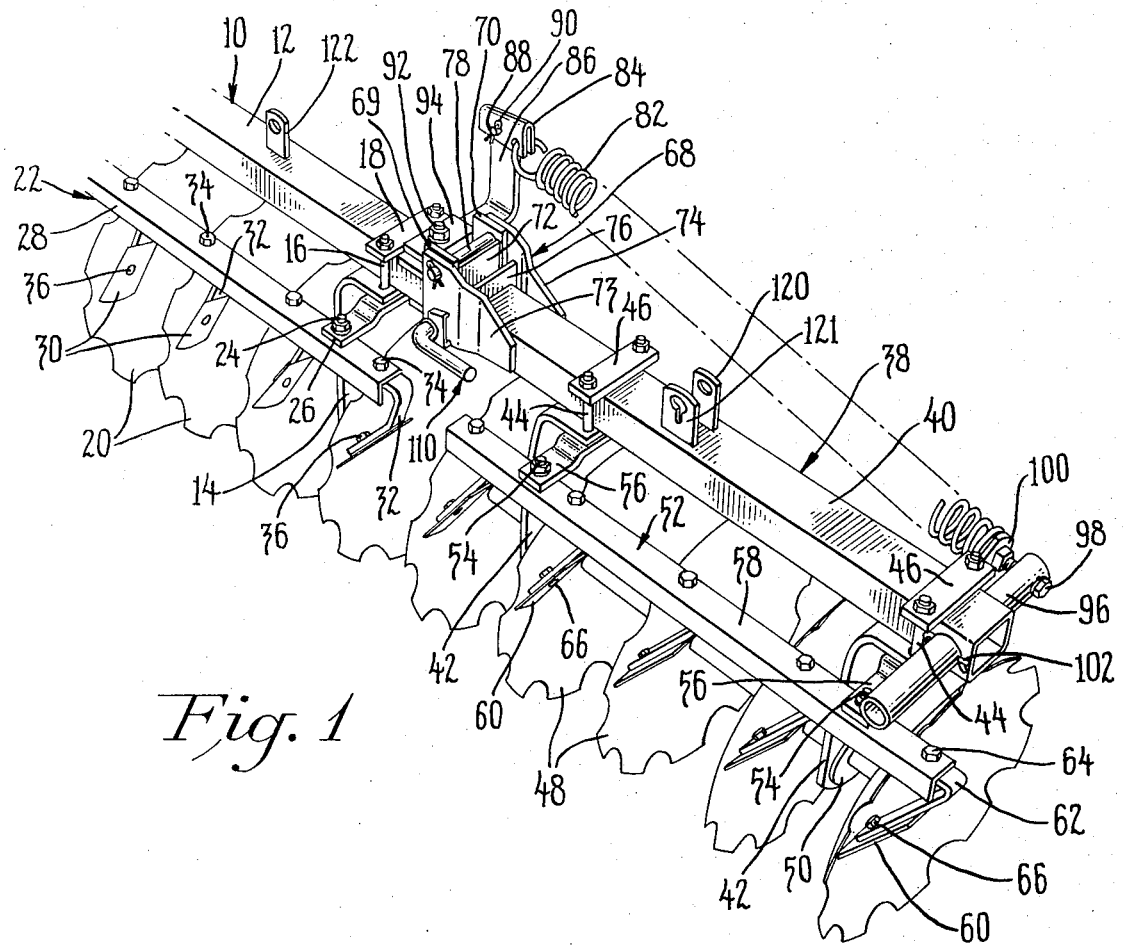
FIG. 1 is a perspective view showing a folding wing for a disc harrow attached to the end of the main gang and locked in the operating position.

A portion of the main gang 10 is shown in FIG. 1. The main gang 10 includes a gang beam 12. The gang beam 12 is preferably a tubular member with a rectangular cross-section. At least two standards 14, only one of which is shown, are attached to the gang beam 12 by bolts 16 and a plate 18. A plurality of discs 20 are rotatably supported by the standard 14.

A scraper 22 is attached to the main gang 10 by bolts 24 and a pair of brackets 26, only one of which is shown. The brackets 26 are attached to the standards 14 and the gang beam 12 by the bolts 16. The scraper 22 includes a scraper bar 28 and scraper blades 30. One scraper blade 30 is provided for scraping material from each disc 20. The scraper blades 30 are attached to the scraper bar 28 by scraper brackets 32 attached to the scraper bar 28 by the bolts 34. The scraper blades 30 are removably attached to the scraper brackets 32 by bolts 36.

The folding wing 38 includes a gang beam 40 formed from a tube with a rectangular cross-section. A pair of standards 42 are secured to the gang beam 40 by bolts 44 and plates 46. A plurality of discs 48 identical to the discs 20 are rotatably supported by bearings 50 on the lower end of each of the standards 42.

A scraper 52 is attached to the folding wing 38 by bolts 54 and a pair of brackets 56. The brackets 56 are attached to the standards 42 and the folding wing gang beam 40 by the bolts 44. The scraper 52 includes a scraper bar 58 and scraper blades 60. One scraper blade 60 is provided for scraping material from each disc 48. The scraper blades 60 are attached to the scraper bar 58 by scraper brackets 62 attached to the scraper bar 58 by bolts 64. The scraper blades 60 are removably attached to the scraper brackets 62 by bolts 66.

Figure 2:
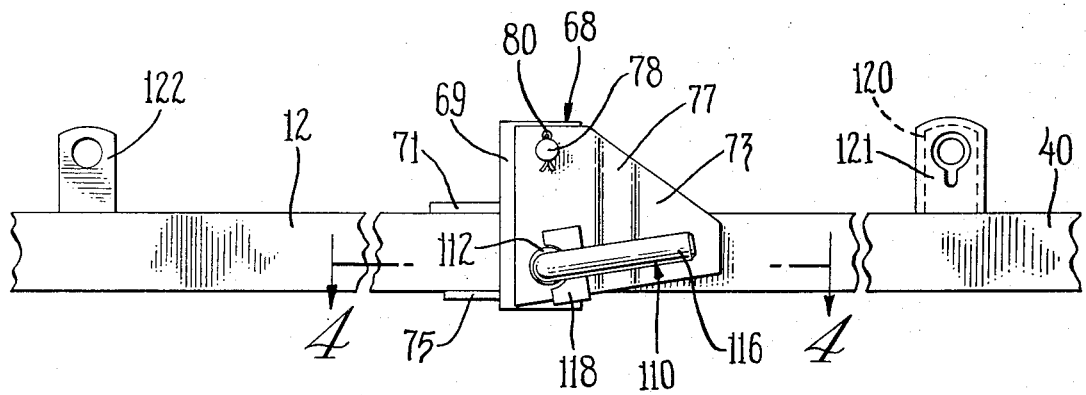
FIG. 2 is an enlarged side elevation of the hinge for the folding wing, the locking device locking the folding wing in the operating position, and portions of the main gang beam and the folding wing gang beam.

The folding wing 38 is attached to the main gang 10 by a hinge 68. The hinge 68 includes two plates 69 and 70 welded to the sides of the gang beam 12 and extending up from the gang beam. A plate 72 is welded to the end of the gang beam 12 and to the two plates 69 and 70 to brace the two plates. A plate 71 is welded to the top of the gang beam 12 between the plates 69 and 70 and a plate 75 is welded to the bottom of the gang beam 12 between the plates 69 and 70 to strengthen the end of the gang beam 12. A pair of plates 73 and 74 are welded to the sides of the folding wing gang beam 40. The plates 73 and 74 extend up from the folding wing gang beam 40 as shown in FIGS. 1 and 2 and past the end of the folding wing gang beam 40. A plate 76 is welded to the end of the folding wing gang beam 40 and to both plates 73 and 74 to brace the plates 73 and 74. The portions of the plates 73 and 74 which extend past the end of the folding wing gang beam 40 are offset at 77 as shown in FIG. 4 so that the inner edges of the portions of the plates 73 and 74 that extend past the end of the folding wing gang beam 40 are adjacent the outer edges of the plates 69 and 70, respectively. A hinge pin 78 passes through the aligned apertures in the plates 73, 69, 70 and 74 at a point above the gang beams 12 and 40. The hinge pin 78 is retained in position by cotter keys 80. The hinge pin 78 is preferably fit to close tolerances to prevent movement of the folding wing gang beam 40 relative to the gang beam 12 except for rotation of the folding wing 38 about the axis of the hinge pin 78. Since there is normally no need to remove the hinge pin 78, the close tolerances do not present a problem.

A spring 82 is provided to assist the operator in rotating the folding wing 38 about the axis of the hinge pin 78. One end of the spring 82 is attached to a U-shaped bracket 84 which is in turn pivotally attached to an upstanding arm on a bracket 86 by a pin 88. The pin 88 is retained by a cotter key 90. The bracket 86 is attached to the end of the gang beam 12 by bolt 92 which passes through holes in the plates 71 and 73 and by a rectangular reinforcing member 94. The other end of the spring 82 is attached to the folding wing 38 by a pipe 96, a bolt 98, and a plug end 100. The pipe 96 extends through holes in the gang beam 40 and is held in place by cotter keys 102. The bolt 98 passes through the pipe 96 and screws into the plug end 100. The plug end 100 screws into the end of the spring 82. The tension on the spring 82 can be adjusted by the bolt 98. Since the spring 82 is attached to the U-shaped bracket 84 at a point spaced above the hinge pin 78 the spring 82 tends to rotate the folding wing 38 about the axis of the hinge pin 78 and thereby raise the free end as shown in FIG. 1. When the folding wing gang beam 40 has been folded into the transport position as shown in FIG. 3 the U-shaped bracket 84 will have rotated 90° about the axis of the pin 88 and the spring 82 will tend to raise the free end of the folding wing gang beam 40. Preferably, a second spring (not shown) identical to the spring 82 would be connected to the implement on the side of the gang beams 12 and 40 opposite the spring 82. With a short light folding wing 38 only one spring 82 is necessary.

The folding wing 38 must be locked in operating position as shown in FIG. 1 to insure that the discs 48 on the folding wing 38 penetrate the soil to the proper depth. This is done by the locking pin 110. The locking pin 110 extends through an aperture 111 in the plate 73, through an aperture 113 in the plate 69 and the end of the gang beam 12, through an aperture 115 in the plate 70 and then through an aperture 117 in the plate 74. Since the locking pin 110 must be inserted and removed in the field by one man without assistance, the holes must be large enough that the locking pin 110 can be inserted without difficulty. However, to prevent wear on the hinge 68 and to obtain optimum performance of the folding wing 38, the folding wing must be locked to prevent all movement of the folding wing 38 relative to the main gang 10. This is made possible an an eccentric 112 on the locking pin 110. The eccentric 112 is attached to the locking pin 110 by a retaining pin 114. The aperture 111 in the plate 73 is large enough to receive the eccentric 112 which is larger in outside diameter than the locking pin 110. By rotating the locking pin 110 the eccentric 112 cams the plate 73 and thereby rotates the folding wing 38 relative to the main gang 10 about the axis of the hinge pin 78 until the locking pin 110 is bound between the plates 74 and 70, thereby preventing rotation about the axis of the hinge pin 78. The other end of the locking pin 110 will be bound between the plate 69, the eccentric 112, and the plate 73. A handle 116 may be provided on the end of the locking pin 110 to facilitate turning of the locking pin. When the locking pin 110 is turned to lock the hinge 68 the retaining pin 114 moves behind the bracket 118 and thereby prevents the locking pin 110 from working out.

A pair of brackets 120 and 121 are provided on the folding wing gang beam 40 to cooperate with the bracket 122 on the gang beam 12 for locking the folding wing 38 in the transport position as shown in FIGS. 3 and 6. The bracket 121 has an enlarged opening for receiving the eccentric 112 and a slot for the passage of the retaining pin 114. The folding wing gang beam 40 is held in the transport position as shown in FIGS. 3 and 6 by passing the locking pin 110 through the opening in the bracket 121 through the bracket 122 and then through the bracket 120. The retaining pin 114 will hold the locking pin 110 in place as shown in FIG. 6 until the locking pin 110 is rotated to align the retaining pin 114 with the slot in the bracket 121. The locking pin 110 is needed to hold the folding wing 38 in the transport position since the spring 82 tends to lift the free end of the folding wing 38 when the folding wing is in the transport position.

We claim:

1. An improved folding wing lock for an agricultural implement characterized by a main gang, a folding wing gang, at least one hinge pin for pivotally attaching the folding wing gang to the main gang, an aperture through one of the gangs spaced from the axis of the hinge pin, a first and a second portion of the other gang including apertures in alignment with the aperture through said one of the gangs, a circular locking pin, with a diameter sufficiently less than the diameter of the apertures through said one of the gangs and through the second portion of the other gang to permit easy insertion of the locking pin, extending through the aperture in said first portion of the other gang, through the aperture in said one of the gangs and then through the aperture in the second portion of the other gang, cam means on the locking pin with a circular cam surface that is eccentric to the longitudinal axis of the locking pin and in contact with said first portion of the other gang said circular cam surface having an eccentricity that is larger than the difference between the diameter of the locking pin and the diameter of the larger of the apertures through said one of the gangs and through the second portion of the other gang so that upon rotation of the cam means the folding wing gang will pivot about the axis of the hinge pin relative to the main gang until a portion of the locking pin spaced from the cam means prevents further pivotal movement about the axis of the hinge pin.

2. The improved folding wing lock of claim 1 characterized by said cam means comprising a portion that is non-rotatably attached to the locking pin.

3. The improved folding wing lock of claim 1 characterized by said locking pin being substantially parallel to said hinge pin.

4. A locking device including a first member, a second member, means pivotally attaching the first member to the second member, an aperture extending through the first member, portions of the second member extending along and adjacent each end of the aperture extending through the first member, a pair of apertures extending through said portions of the second member, a circular locking pin, with a diameter sufficiently less than the diameter of the apertures through the first member and one of the apertures through portions of the second member to permit easy insertion of the locking pin, projecting through one of the apertures in the second member, through the aperture extending through the first member, and through the second aperture in the second member, one of said pair of apertures in the second member acts as a cam surface on the second member, a cam portion on the locking pin including a circular cam surface that is eccentric to the longitudinal axis of the locking pin said circular cam surface having an eccentricity that is larger than the difference between the diameter of the locking pin and the diameter of the aperture through the first member so that upon rotation the circular cam surface contacts the cam surface on the second member and rotates the first member relative to the second member about the axis of the means pivotally attaching the first member to the second member until both ends of the locking pin are rigidly held between the first and second members and pivotal movement of the second member relative to the first member in either direction is prevented.

5. The locking device of claim 4 further including means to positively hold the pin in the apertures when the cam portion has been rotated to lock the first member relative to the second member.

* * * * *